(12) United States Patent
Rubens et al.

(10) Patent No.: US 12,243,352 B2
(45) Date of Patent: Mar. 4, 2025

(54) METHODS AND SYSTEMS FOR ADAPTIVE BINARIZATION THRESHOLDING FOR PUPIL SEGMENTATION

(71) Applicants: Calvin John Rubens, Ottawa (CA); Sean Braley, Orillia (CA)

(72) Inventors: Calvin John Rubens, Ottawa (CA); Sean Braley, Orillia (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 97 days.

(21) Appl. No.: 17/978,717

(22) Filed: Nov. 1, 2022

(65) Prior Publication Data
US 2024/0144722 A1    May 2, 2024

(51) Int. Cl.
*G06V 40/18*  (2022.01)
*G06T 5/20*  (2006.01)
*G06T 5/40*  (2006.01)
*G06T 7/13*  (2017.01)
*G06V 10/25*  (2022.01)
(Continued)

(52) U.S. Cl.
CPC ............. *G06V 40/193* (2022.01); *G06T 5/20* (2013.01); *G06T 5/40* (2013.01); *G06T 7/13* (2017.01); *G06V 10/25* (2022.01); *G06V 10/28* (2022.01); *G06V 10/46* (2022.01)

(58) Field of Classification Search
CPC ...... G06V 40/193; G06V 10/25; G06V 10/28; G06V 10/46; G06T 7/13; G06T 5/20; G06T 5/40
See application file for complete search history.

(56) References Cited

U.S. PATENT DOCUMENTS

2011/0150334 A1* 6/2011 Du ................. G06V 40/19
                                                 382/173
2020/0311888 A1* 10/2020 Li ................... G06T 7/136

FOREIGN PATENT DOCUMENTS

CN    104463159 A  *  3/2015   ......... G06K 9/00597
KR    20170106061 A  *  9/2017   ............... G06K 9/00

OTHER PUBLICATIONS

Gheis Mohammadi A Fast and Accurate Pupil and Iris Localization Method Usable with a Regular Camera (IJCSIS) International Journal of Computer Science and Information Security, vol. 13, No. 5, May 2015 (Year: 2015).*

(Continued)

*Primary Examiner* — Rowina J Cattungal

(57) ABSTRACT

Methods and systems are described for estimating an optimal pupil binarization threshold using adaptive binarization thresholding. The disclosed methods and systems are designed to determine a pupil binarization threshold from a histogram of an eye image. An eye image is obtained and an eye image histogram is computed from the eye image. A pupil region and an iris region are identified in the eye image histogram and the second derivative of the eye image histogram is computed. The pupil binarization threshold is determined based on the second derivative of the eye image histogram, the identified pupil region and the identified iris region and then used to generate a binarized eye image. A pupil contour may be determined from the binarized eye image. The disclosed system may help to overcome challenges associated with robust and precise detection of a pupil contour, for example, in images of varying quality.

20 Claims, 11 Drawing Sheets

(51) Int. Cl.
   *G06V 10/28* (2022.01)
   *G06V 10/46* (2022.01)

(56) References Cited

OTHER PUBLICATIONS

Yang et al. "A Pupil Location Method Based on Improved OTSU Algorithm". Proceedings of IEEE CCIS2012 2012.

Bonteanu et al., "A Robust Pupil Detection Algorithm based on a New Adaptive Thresholding Procedure". The 7th IEEE International Conference on E-Health and Bioengineering—EHB 2019 Nov. 21, 2019.

Wang et al. "Global Adaptive Optimization Parameters For Robust Pupil Location". 2021 17th International Conference on Computational Intelligence and Security (CIS) 2021.

* cited by examiner

METHODS AND SYSTEMS FOR ADAPTIVE BINARIZATION THRESHOLDING FOR PUPIL SEGMENTATION

FIELD

The present disclosure relates to the field of computer vision, in particular methods and systems for pupil segmentation using adaptive thresholding.

BACKGROUND

Eye-tracking or gaze estimation systems track eye movements and estimate a point of gaze either on a display screen or in the surrounding environment. Gaze tracking is a useful indicator of human visual attention and has wide ranging applications in areas such as human-computer interaction, automotive safety, medical diagnoses, and accessibility interfaces, among others. To capitalize on the benefits of gaze tracking, monitoring systems should preferably operate with a high degree of accuracy and be minimally affected by image quality or noise.

A common approach for gaze estimation is video-based eye tracking. In such cases, a camera is used to capture eye images. Cameras may be infrared (IR) cameras (which capture IR spectrum data) or RGB cameras (which capture visible spectrum data). Automatic pupil detection or segmentation in captured eye images is often a key element of gaze tracking workflows. The ability to consistently detect a precise pupil contour and determine an associated pupil center from eye images has implications for accurate gaze tracking and other computer vision tasks, however it can be difficult to preserve important features of the pupil during image processing of images of varying quality that are required for pupil segmentation.

Therefore, it would be useful to provide a method and system for improved pupil segmentation.

SUMMARY

In various examples, the present disclosure describes methods and systems for pupil detection using adaptive binarization thresholding. The disclosed methods and systems are designed to determine an optimal pupil binarization threshold from a histogram of an eye image that maximally captures the geometric features of the pupil. An eye image is obtained and an eye image histogram is computed from the eye image. A pupil region and an iris region are identified in the eye image histogram and the second derivative of the eye image histogram is computed. The pupil binarization threshold is determined based on the gray value associated with a prominent peak of the second derivative of the eye image histogram, along with the identified pupil region and the identified iris region. The binarization threshold is then used to generate a binarized eye image, from which a pupil contour may be determined. The disclosed system may help to overcome challenges associated with robust and precise detection of a pupil contour, for example, in images of varying quality.

In various examples, the present disclosure provides the technical effect that an optimal adaptive binarization threshold is determined that reduces the complexity of an eye image while maximally preserving the pupil contour.

In some examples, the present disclosure provides the technical advantage that the adaptive binarization threshold is obtained using a method that is simple, fast and effective on a wide range of hardware platforms (e.g. phones, machine vision cameras, webcams etc.) while simultaneously exhibiting robust performance with poor or low quality inputs, for example, images captured in variable lighting conditions, unfocused images, low contrast images, low quality (noisy) images and on images of varying resolutions.

In some examples, the present disclosure provides the technical advantage of using a windowed search area for evaluating the optimal threshold between a pupil and iris feature. In this regard, the methods and systems are robust enough to determine an optimal binarization threshold in the presence of artifacts within the eye image that are darker than the pupil (e.g. pigments, shadows, out-of-focus regions and regions that are insufficiently illuminated), for example, by enabling dark artifacts to be dilated and masked from the original image prior to pupil threshold binarization. In examples, simplifying the binarized output image has a benefit of improving the efficiency and effectiveness of pupil contour estimation.

In some examples, the present disclosure provides the technical advantage that the windowed search area or other histographic references may be stored in memory and retrieved during processing of successive eye images or video frames to reduce processing time and complexity. Similarly, the flow of pupil and iris peaks may be tracked between successive image histograms, in order to bound the histogram search window, further reducing processing time and complexity In some examples, the present disclosure provides the technical advantage that applying an incremental high-pass filter to refine the upper boundary of the threshold search area improves the robustness to anomalous features between pupil and iris histographic features.

In some examples, the present disclosure provides the technical advantage that the method can be cascaded on a sub-frame of the original eye image after the pupil has already been located at least once, to further refine the binarization threshold.

Examples of the present disclosure may enable improved gaze estimation performance in real-life environments using a mobile device (e.g. under poor illumination conditions) or for virtual reality (VR) or augmented reality (AR) environments, using an accurate and computationally simple adaptive pupil segmentation method. Example applications benefiting from improved pupil binarization include gaze tracking (e.g. for personal devices, smart home devices, accessible technologies, attentive-aware devices, driver/passenger monitoring systems or external environment monitoring systems, among others), eye tracking (e.g. medical procedures, ocular and neurological tests), pupil dilation tracking in response to visible light (e.g. detecting changes in emotional or mental state, neurological assessment, concussion evaluation etc.).

In some aspects, the present disclosure describes a method. The method comprises a number of steps. The method comprises: obtaining an eye image captured by a camera; computing an eye image histogram that represents a frequency distribution of a plurality of pixel values within the eye image; identifying a pupil region in the eye image histogram; identifying an iris region in the eye image histogram; and determining a pupil binarization threshold based on the second derivative of the eye image histogram, the identified pupil region in the eye image histogram and the identified iris region in the eye image histogram.

In the preceding example aspect of the method, the method further comprises: generating a binarized eye image based on the eye image and the pupil binarization threshold.

In the preceding example aspect of the method, the method further comprises: determining a pupil contour based on the binarized eye image; and determining a pupil center based on the pupil contour.

In some example aspects of the method, determining a pupil binarization threshold comprises: computing a second derivative of the eye image histogram to generate a pixel population acceleration; identifying a prominent acceleration peak in the pixel population acceleration, the prominent acceleration peak having a corresponding gray value; and determining the pupil binarization threshold based on the gray value corresponding to the prominent acceleration peak.

In the preceding example aspect of the method, the method further comprises: prior to determining a pupil binarization threshold: identifying an artifact region in the eye image histogram; identifying an artifact region acceleration peak in the pixel population acceleration, the artifact region acceleration peak having a corresponding gray value; and determining an artifact threshold as the gray value corresponding to an artifact region acceleration peak.

In the preceding example aspect of the method, the method further comprises: generating an artifact mask based on the eye image and the artifact threshold; and applying the artifact mask to the binarized eye image.

In some example aspects of the method, the method further comprises: prior to identifying a pupil region in the eye image histogram: processing the eye image histogram using an incremental high-pass filter.

In some example aspects of the method, wherein the pupil region in the eye image histogram includes an upper pupil region boundary and a lower pupil region boundary and the iris region in the eye image histogram includes an upper iris region boundary and a lower iris region boundary.

In some example aspects of the method, wherein the eye image is a grayscale eye image and the histogram represents a frequency distribution of pixel gray values in the grayscale eye image.

In an example aspect, the present disclosure describes a system for determining a pupil binarization threshold. The system comprises: one or more processor devices; and one or more memories storing machine-executable instructions, which when executed by the one or more processor devices, cause the system to: obtain an eye image; compute an eye image histogram that represents a frequency distribution of a plurality of pixel values within the eye image; identify a pupil region in the eye image histogram; identify an iris region in the eye image histogram; and determine a pupil binarization threshold based on the second derivative of the eye image histogram, the identified pupil region in the eye image histogram and the identified iris region in the eye image histogram.

In the preceding example aspect of the system, the system further comprises: a camera, wherein the eye image is captured by the camera.

In some preceding example aspects of the system, the system further comprises: a head mounted device; and a camera coupled to the head mounted device, wherein the eye image is captured by the camera.

In some preceding example aspects of the system, the machine-executable instructions, when executed by the one or more processors further cause the system to: generate a binarized eye image based on the eye image and the pupil binarization threshold.

In the preceding example aspect of the system, the machine-executable instructions, when executed by the one or more processors further cause the system to: determine a pupil contour based on the binarized eye image; and determine a pupil center based on the pupil contour.

In some preceding example aspects of the system, the machine-executable instructions, when executed by the one or more processors to determine a pupil binarization threshold, further cause the system to: compute a second derivative of the eye image histogram to generate a pixel population acceleration; identify a prominent acceleration peak in the pixel population acceleration, the prominent acceleration peak having a corresponding gray value; and determine the pupil binarization threshold based on the gray value corresponding to the prominent acceleration peak.

In the preceding example aspect of the system, the machine-executable instructions, when executed by the one or more processors further cause the system to: prior to determining a pupil binarization threshold: identify an artifact region in the eye image histogram; identify an artifact region acceleration peak in the pixel population acceleration, the artifact region acceleration peak having a corresponding gray value; determine an artifact threshold as the gray value corresponding to an artifact region acceleration peak; generate an artifact mask based on the eye image and the artifact threshold; and apply the artifact mask to the binarized eye image.

In some preceding example aspects of the system, the machine-executable instructions, when executed by the one or more processors, further cause the system to: prior to identifying a pupil region in the eye image histogram: process the eye image histogram using an incremental high-pass filter.

In some preceding example aspects of the system, wherein the pupil region includes an upper pupil region boundary and a lower pupil region boundary and the iris region includes an upper iris region boundary and a lower iris region boundary.

In some preceding example aspects of the system, wherein the eye image is a grayscale eye image and the histogram represents a frequency distribution of pixel gray values in the grayscale eye image.

In some aspects, the present disclosure describes a non-transitory computer-readable medium having machine-executable instructions stored thereon which, when executed by one or more processors of a computing system, cause the computing system to: obtain an eye image; compute an eye image histogram that represents a frequency distribution of a plurality of pixel values within the eye image; identify a pupil region in the eye image histogram; identify an iris region in the eye image histogram; and determine a pupil binarization threshold based on the second derivative of the eye image histogram, the identified pupil region in the eye image histogram and the identified iris region in the eye image histogram.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Figure 1:
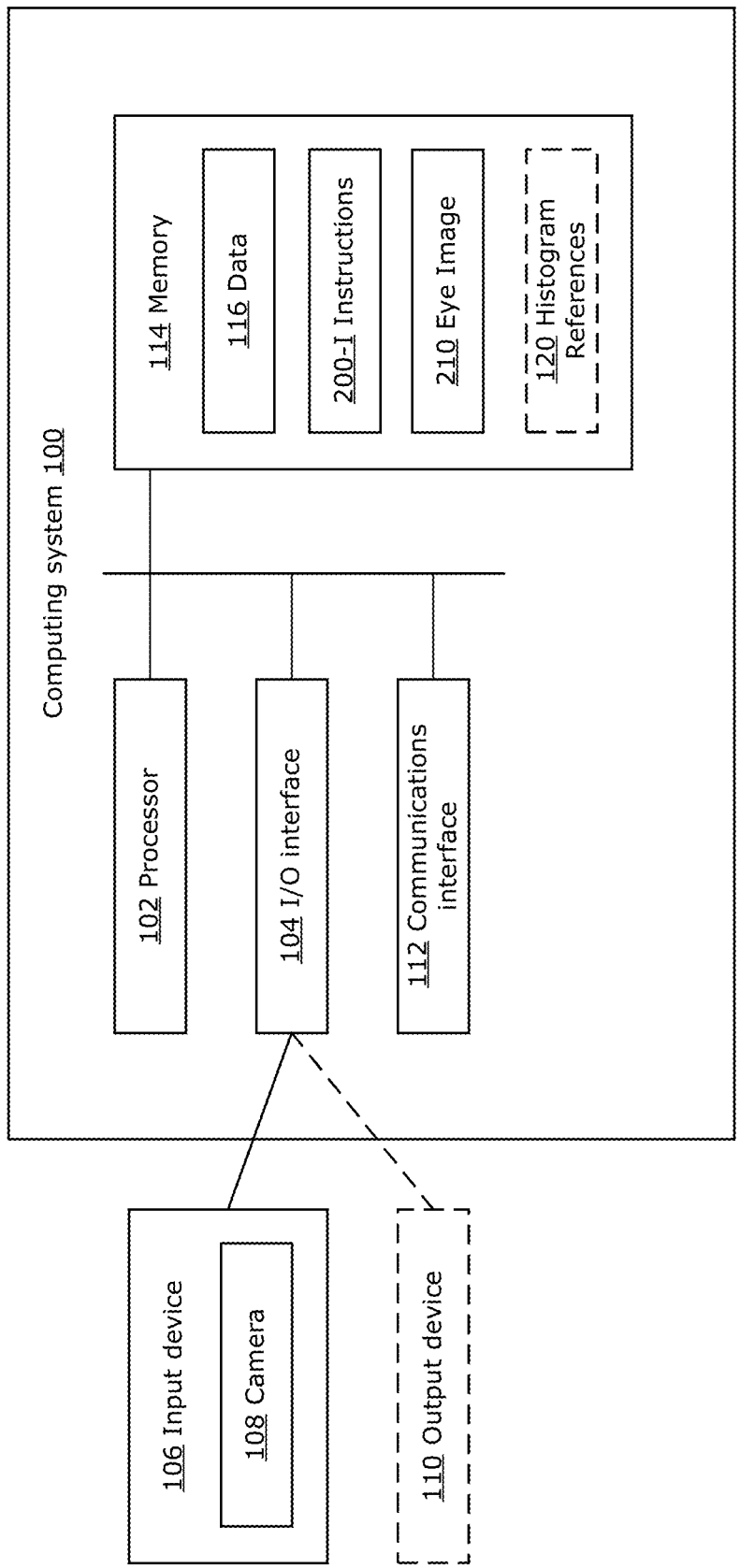
FIG. 1 is a block diagram illustrating an example hardware structure of a computing system that is suitable for implementing embodiments of the present disclosure.

The following describes example technical solutions of this disclosure with reference to accompanying drawings.

In various examples, the present disclosure describes methods and systems for pupil detection using adaptive binarization thresholding. The disclosed methods and systems are designed to determine an optimal pupil binarization threshold from a histogram of an eye image that maximally captures the geometric features of the pupil. An eye image is obtained and an eye image histogram is computed from the eye image. A pupil region and an iris region are identified in the eye image histogram and the second derivative of the eye image histogram is computed. The pupil binarization threshold is determined based on the gray value associated with a prominent peak of the second derivative of the eye image histogram, along with the identified pupil region and the identified iris region. The binarization threshold is then used to generate a binarized eye image, from which a pupil contour may be determined. The disclosed system may help to overcome challenges associated with robust and precise detection of a pupil contour, for example, in images of varying quality.

To assist in understanding the present disclosure, some existing techniques for pupil segmentation are now discussed.

Pupil segmentation refers to a process whereby eye image pixels are classified based on whether they are associated with a pupil-region of the eye or another non-pupil region of the eye (e.g. iris region, sclera region). Existing pupil segmentation methods can be categorized by the type of algorithm used to detect a pupil region from an image, for example, by detecting a pupil contour in an eye image that serves as a boundary separating the pupil region from a non-pupil region of the eye.

One common approach for pupil segmentation is histogram-based thresholding. Histogram-based thresholding often employs a binary classification approach assuming that elements of an image can be classified as belonging to either a "foreground" or a "background", and where an optimum threshold level serves to divide the histogram into the two classes. For example, to expose the pupil and/or the iris of the eye depending on desired implementation. An example of a histogram-based thresholding method is described in: Yang, Fan, et al. "A pupil location method based on improved OTSU algorithm," 2012 *IEEE 2nd International Conference on Cloud Computing and Intelligence Systems*, Vol. 3. IEEE, 2012, the entirety of which is hereby incorporated by reference. The approach presented in Yang et al. (2012) adapts the well-known OTSU global thresholding method to find an optimized threshold between the pupil and iris based on class-variance of an image histogram. Another histogram-based thresholding approach for pupil segmentation employing percentile histograms is described in: Bonteanu, Petronela, et al. "A robust pupil detection algorithm based on a new adaptive thresholding procedure," 2019 *E-Health and Bioengineering Conference (EHB)*, IEEE, 2019, the entirety of which is hereby incorporated by reference. The approach presented in Bonteanu et al. (2019) examines prominent features and other qualities of the percentile function to determine an appropriate pupil threshold. In another example, a global thresholding method for pupil segmentation is described in: Wang, Yang, Xiaoyi Lu, and Wenjun Zhou. "Global adaptive optimization parameters for robust pupil location," 2021 *17th International Conference on Computational Intelligence and Security (CIS)*, IEEE, 2021, which is incorporated herein by reference.

Histogram-based thresholding methods can be tuned to perform with high accuracy in controlled or consistent conditions, but may suffer from limitations impacting pupil contour accuracy in variable conditions, for example, in variable lighting conditions producing low-contrast images or images with significant shadows or dark regions, or other conditions impacting image quality. Furthermore, image processing techniques designed to account for variable image conditions or to reduce image complexity may further hinder pupil segmentation accuracy by failing to preserve important features of the pupil in the image. As a result, current pupil segmentation methods designed for low computational complexity across a variety of technological platforms and real-world implementation scenarios cannot provide both high precision and robust, consistent performance.

Edge detectors are also frequently employed for pupil segmentation in order to detect the pupil contour within a region of interest, however they can perform poorly on out-of-focus images or images with low contrast. Furthermore, edge detectors may accurately detect edges of the pupil but may also produce unwanted artifacts by detecting edges of other features in an image, introducing additional noise and increasing processing complexity. Finally, machine learning-based pupil segmentation approaches are popular for their robust performance, however they tend to lack precision and may be computationally expensive, impacting performance particularly on low power hardware.

The present disclosure describes examples that may help to address some or all of the above drawbacks of existing technologies.

To assist in understanding the present disclosure, the following describes some concepts relevant to pupil segmentation and binarization thresholding, along with some relevant terminology that may be related to examples disclosed herein.

In the present disclosure, "segmentation" can mean: a process whereby image pixels are classified as belonging to one or more classes, for example, corresponding to an object or a specific region of interest within an image. Within the context of pupil segmentation, pixels of an eye image may be segmented into a pupil-region of the eye or another non-pupil region of the eye (e.g. iris region, sclera region).

In the present disclosure, "binarization" or "image binarization" can mean: the segmentation of pixels in an eye image into binary classes, namely, a "foreground" and a "background". In examples, binarization is commonly performed using thresholding.

In the present disclosure, a "binarization threshold" can mean: an optimized threshold value that serves to separate pixels into one of the binary classes by comparison of a pixel value with the threshold value. For example, binarization of a grayscale image to generate a binary image (e.g. black and white image) may include classifying pixels based on the threshold value as "foreground" or black (e.g. grayscale value of 0) and classifying pixels based on the threshold value as "background" or white (e.g. grayscale value of 255). In this regard, considering that a pupil is a dark region of an image, a binarization threshold optimized for pupil segmentation may isolate the pupil region from the remainder of the image.

In the present disclosure, "adaptive thresholding" can mean: a method of determining a threshold value for a histogram representing pixel values from a portion or a region of an image. In this regard, adaptive thresholding may account for spatial variations in illumination, or other spatial variations in an image and may produce a threshold value for segmenting classes of pixels for a specific portion or region of an image. In examples the adaptive threshold may be applied globally to binarize an entire image. In the present disclosure, "global thresholding" can mean: a method of determining a threshold value for a histogram representing pixel values for an entire image.

In the present disclosure, a "gray level histogram" can mean: a graph used to illustrate a frequency distribution of pixel gray value for a population of pixels in a grayscale image, for example, an eye image. In examples, the gray level histogram may appear as a bar chart where each bar contains the number of observations of a particular variable, or in other examples the gray level histogram may appear as a continuous line chart where data points have been interpolated at some resolution. In examples, a gray value histogram may be presented as a histogram of the number of pixels corresponding to a range of gray values or the histogram may be normalized such that the ranges of the axes of the histogram span from 0-1.

In the present disclosure, a "pupil contour" can mean: a boundary in an eye image separating the pupil region from a non-pupil region of the eye, for example, an iris region.

FIG. 1 is a block diagram illustrating an example hardware structure of a computing system 100 that is suitable for implementing embodiments described herein. Examples of the present disclosure may be implemented in other computing systems, which may include components different from those discussed below. The computing system 100 may be used to execute instructions for pupil segmentation, using any of the examples described herein. The computing system 100 may also be used to train blocks of the pupil segmentation system 200, or blocks of the pupil segmentation system 200 may be trained by another computing system.

Although FIG. 1 shows a single instance of each component, there may be multiple instances of each component in the computing system 100. Further, although the computing system 100 is illustrated as a single block, the computing system 100 may be a single physical machine or device (e.g., implemented as a single computing device, such as a single workstation, single end user device, single server, etc.), and may include mobile communications devices (smartphones), laptop computers, tablets, desktop computers, vehicle driver assistance systems, smart appliances, wearable devices, assistive technology devices, medical diagnostic devices, gaming devices, virtual reality devices, augmented reality devices, Internet of Things (IoT) devices, interactive kiosks, advertising and interactive signage, and educational tools, among others.

The computing system 100 includes at least one processor 102, such as a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 100 may include an input/output (I/O) interface 104, which may enable interfacing with an input device 106 and/or an optional output device 110. In the example shown, the input device 106 (e.g., a keyboard, a mouse, a microphone, a touchscreen, and/or a keypad) may also include a camera 108. In examples, the camera 108 may be an infrared (IR) light camera or a visible light (e.g. RGB) camera, among others. In the example shown, the optional output device 110 (e.g., a display, a speaker and/or a printer) are shown as optional and external to the computing system 100. In other example embodiments, there may not be any input device 106 and output device 108, in which case the I/O interface 104 may not be needed.

The computing system 100 may include an optional communications interface 112 for wired or wireless communication with other computing systems (e.g., other computing systems in a network). The communications interface 112 may include wired links (e.g., Ethernet cable) and/or wireless links (e.g., one or more antennas) for intra-network and/or inter-network communications.

The computing system 100 may include one or more memories 114 (collectively referred to as "memory 114"), which may include a volatile or non-volatile memory (e.g., a flash memory, a random access memory (RAM), and/or a read-only memory (ROM)). The non-transitory memory 114 may store instructions for execution by the processor 102, such as to carry out examples described in the present disclosure. For example, the memory 114 may store instructions for implementing any of the methods disclosed herein. The instructions can include instructions 200-I for implementing and operating the pupil segmentation system 200 described below with reference to FIG. 2. The memory 114 may include other software instructions, such as for implementing an operating system (OS) and other applications/functions.

The memory 114 may also store other data 116, information, rules, policies, and machine-executable instructions described herein, including eye images 210 captured by the camera 108, or histogram references 120, including stored histogram boundary locations or stored histogram peak locations corresponding to an eye image 210, among others.

In some examples, the computing system 100 may also include one or more electronic storage units (not shown), such as a solid state drive, a hard disk drive, a magnetic disk drive and/or an optical disk drive. In some examples, data and/or instructions may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 114 to implement data storage, retrieval, and caching functions of the computing system 100. The components of the computing system 100 may communicate with each other via a bus, for example.

Figure 2:
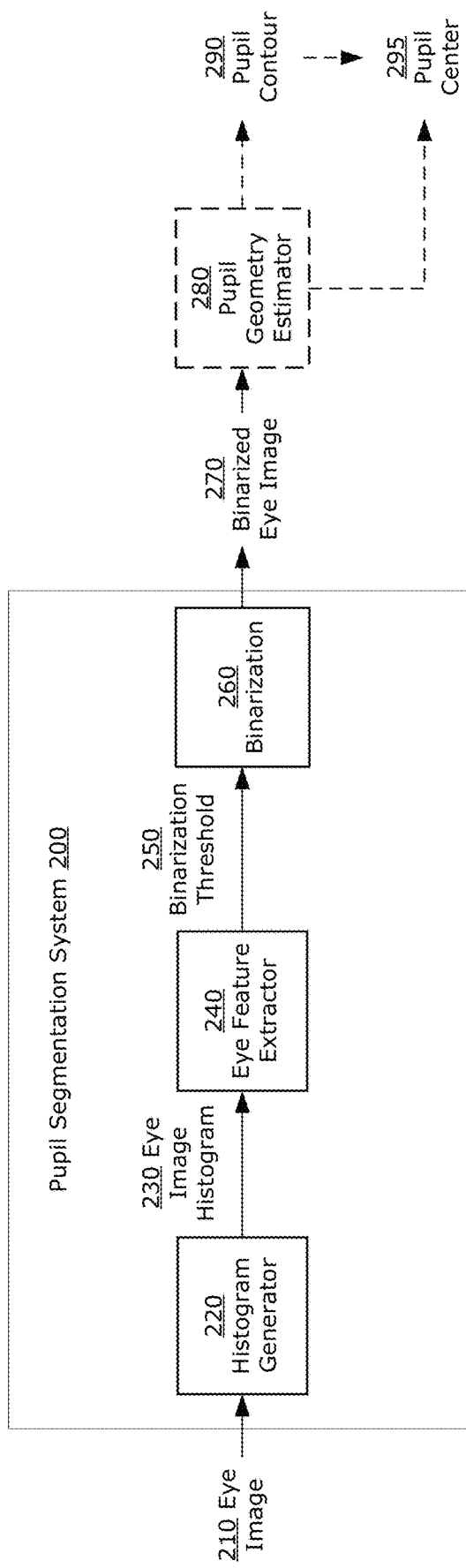
FIG. 2 is a block diagram illustrating an example architecture of a pupil segmentation system, in accordance with examples of the present disclosure.

FIG. 2 is a block diagram illustrating an example architecture of the pupil segmentation system 200 that may be used to implement methods to generate a binarized eye image 270, in accordance with examples of the present disclosure.

In some examples, the pupil segmentation system 200 receives an input of an eye image 210 and outputs an binarized eye image 270. The eye image 210 may be captured by a camera 108 on the computing system 100 or may be a digital image taken by another camera on another electronic device and communicated to the computing system 100 (e.g., in the case where the computing system 100 provides a pupil binarization service to other devices). In examples, an eye image 210 may be an IR image or an RGB image represented as a 2D matrix encoding individual pixels of the input image. In examples, the eye image 210 may be captured as a video frame rather than a static image.

In some embodiments, for example, the eye image 210 may be a pre-processed eye image or may undergo processing in advance of being input to the pupil segmentation system 200. In examples, the details of pre-processing may be dependent on the image conditions (e.g. contrast, noise, masking, cropping etc.). In examples, the eye image 210 may be a grayscale eye image in which each pixel of the grayscale eye image may have a corresponding gray value.

In some embodiments, for example, the eye image 210 may be extracted from a face image or another image captured by the camera 108, where the eye image 210 includes an eye region 300 of an individual. In some embodiments, for example, the eye region 300 may be extracted using a machine learning (ML) approach, or in other embodiments, an eye region 300 may be obtained automatically by a head-mounted display (HMD), among others. In examples, the eye image 210 may be cropped and/or masked tightly to the eye region 300, features of which are described with respect to FIG. 3 below.

Figure 3:
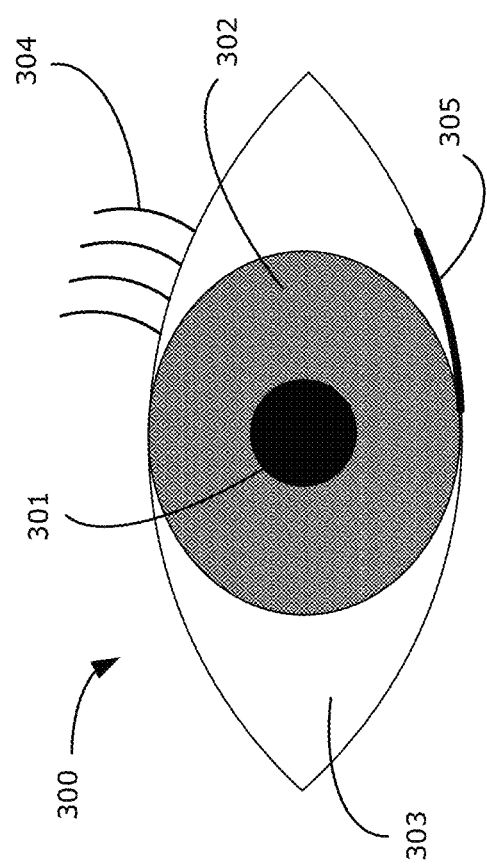
FIG. 3 is an example schematic diagram of an eye region, including a dark pupil, suitable for implementation of examples described herein.

FIG. 3 is an example schematic diagram of an eye region 300, including a dark pupil 301, suitable for implementation of examples described herein. In examples, a pupil 301 may exhibit the characteristic of absorbing light very efficiently, therefore a pupil 301 may present as a dark prominent feature in an eye image 210. Similarly, a pupil 301 may also present as a dark prominent feature in an eye image histogram 230 in one or more color spaces. In examples, the eye region 300 may also include an iris 302 and a sclera 303. In examples, a plurality of eyelashes 304 may also be visible, or optionally, features such as eye makeup 305 may be visible corresponding to the eye region 300.

Returning to FIG. 2, the eye image 210, for example, a grayscale eye image may then be normalized and may be input to a histogram generator 220 to generate an eye image histogram 230. In examples, the eye image histogram 230 may be a gray level histogram, in which the pixel population (or pixel count) of the eye image 210 is distributed with respect to pixel gray value. In examples, the pixel gray value may be a normalized pixel gray value.

Figure 4:
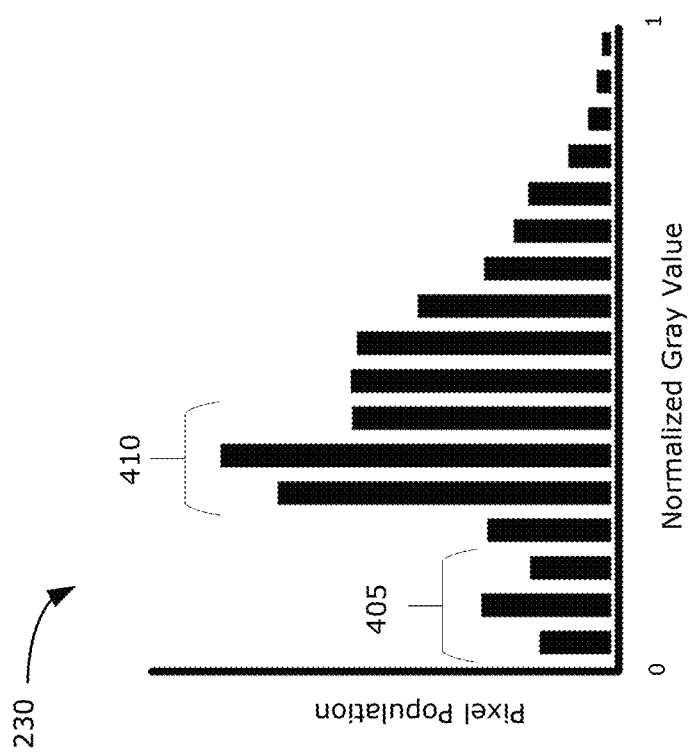
FIG. 4 is an example eye image histogram, in accordance with examples of the present disclosure.

FIG. 4 is an example eye image histogram 230, in accordance with examples of the present disclosure. It should be noted that the example eye image histogram 230 is a simplified example for the purposes of illustration. In examples, the eye image histogram 230 may show two prominent peaks, for example, a first peak representative of the pupil region 405, the pupil region 405 being associated with a darker gray value, and a second peak representative of the iris region 410, the iris region 410 being associated with a lighter gray value. In examples, determining an optimal adaptive threshold value between the greyscale value of the pupil region 405 and the iris region 410 is important in ensuring that the shape of the pupil is maximally preserved during pupil segmentation.

Returning to FIG. 2, the eye image histogram 230 may be input to an eye feature extractor 240 to determine an optimal adaptive binarization threshold 250. In examples, the functional blocks of the eye feature extractor 240 are described below with reference to FIG. 5A.

Figure 5A:
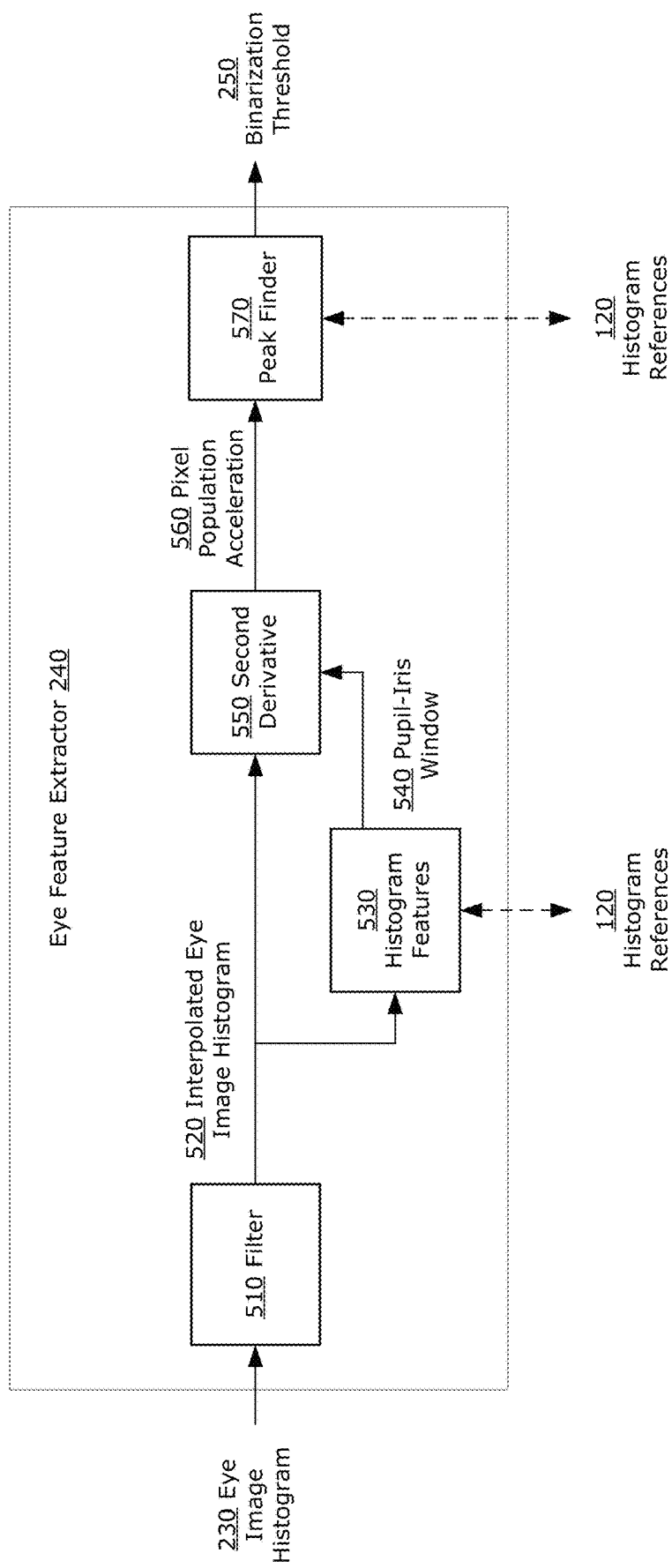
FIG. 5A is a block diagram illustrating an example architecture of an eye feature extractor, in accordance with examples of the present disclosure.
Figure 5B:
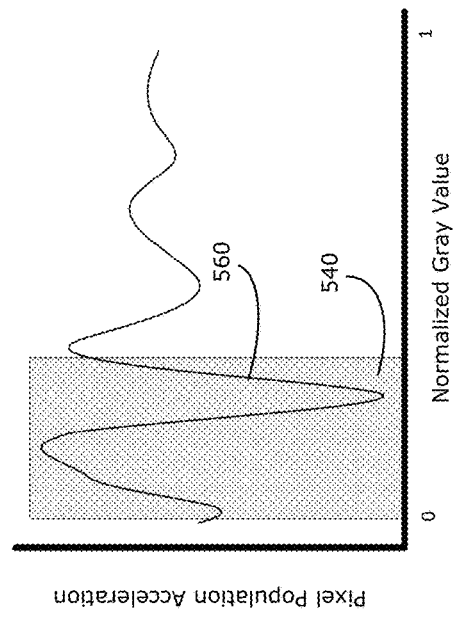
FIG. 5B is an example interpolated eye image histogram, in accordance with examples of the present disclosure.

FIG. 5A is a block diagram illustrating an example architecture of an eye feature extractor 240, in accordance with examples of the present disclosure. In examples, a filter block 510 of the eye feature extractor 240 may receive the eye image histogram 230 and may output an interpolated eye image histogram 520. In examples, the filter block 510 may serve to remove noise or other undesirable values from the eye image histogram, or to more effectively expose eye features in the histogram, for example, the pupil region 405 or the iris region 410, among other benefits. In examples, the filter block 510 may also include a linear interpolation operation to help smooth the eye image histogram 230. An example interpolated eye image histogram 520 is presented in FIG. 5B, in accordance with examples of the present disclosure. In examples, a histogram features block 530 may determine upper and lower boundaries for both the pupil region 405 and the iris region 410, where the boundaries correspond to a gray value in the interpolated eye image histogram 520. In examples, the boundaries of the pupil region 405 and the iris region 410 may be used be used by the histogram features block 530 to define a pupil-iris window 540 that spans a gray value corresponding to the pupil region 405 and the iris region 410 in the interpolated eye image histogram 520.

In some embodiments, for example, the upper and lower boundaries of the pupil region 405 and the iris region 410 for a first eye image 210a in a sequence of eye images may be stored (e.g. in memory 114) by the histogram features block 530 of the eye feature extractor 240 as at least one of a plurality of histogram references 120. In some embodiments, for example, the histogram references 120 may be retrieved by the histogram features block 530 during processing of a second eye image 210b and used as starting boundaries for an initial search window when determining histographic features (e.g. upper and lower boundaries of the pupil region 405 and iris region 410). In examples, storing and retrieving histogram references 120 may be beneficial in helping to reduce processing time between successive eye images 210 in a sequence of video frames or static images.

Figure 5C:
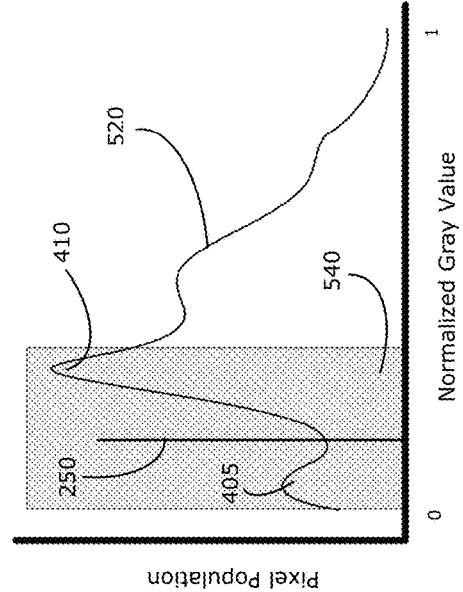
FIGS. 5C and 5D are example pixel population accelerations, in accordance with examples of the present disclosure.

In examples, the interpolated eye image histogram 520 may also be input to a second derivative block 550 to generate a pixel population acceleration 560. In examples, the second derivative of the interpolated eye image histogram 520 may be computed and filtered, to obtain the pixel population acceleration 560 with respect to the grey value. An example pixel population acceleration 560 is presented in FIG. 5C, in accordance with examples of the present disclosure. In examples, prior to computing a second derivative of the interpolated eye image histogram 520, a first derivative may be computed, and optionally filtered, to obtain a pixel population velocity. In examples, the pupil-iris window 540 may also be indicated in FIG. 5C.

Figure 5D:
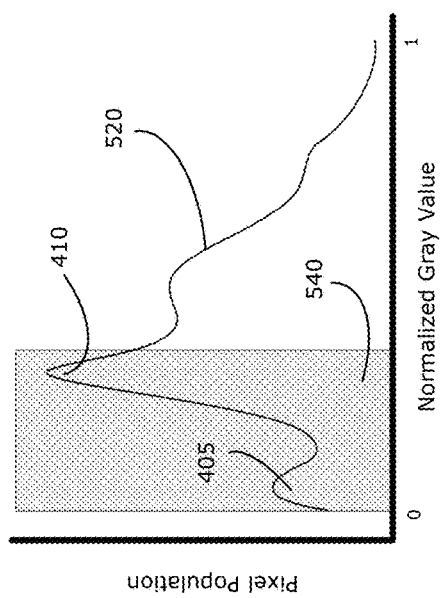
Figure 5E:
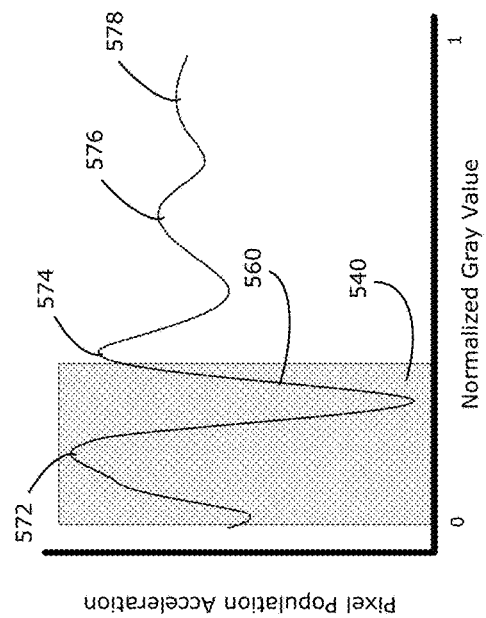
FIG. 5E is an example interpolated eye image histogram, in accordance with examples of the present disclosure.

In examples, a peak finder 570 may be used to identify acceleration peaks in the pixel population acceleration 560. An example pixel population acceleration showing acceleration peaks 572, 574, 576 and 578 is presented in FIG. 5D, in accordance with examples of the present disclosure. In examples, a first prominent acceleration peak 572 identified in the pixel population acceleration 560 that is located within the pupil-iris window 540 may be used to determine the optimal binarization threshold 250 for the eye image 210. In examples, the gray value corresponding to the first prominent acceleration peak 572 may be defined as the optimal binarization threshold 250, for example, the binarization threshold value that maximally captures the geometric features of the pupil in an eye image 210. FIG. 5E illustrates an example interpolated eye image histogram 520 of FIG. 5B, including a binarization threshold 250, in accordance with examples of the present disclosure. In examples, the binarization threshold 250 in FIG. 5E corresponds to the first prominent peak 572 in the pixel population acceleration 560 of FIG. 5D, with respect to the pupil region 405, the iris region 410 and the pupil-iris window 540.

In some embodiments, for example, the acceleration peaks 572, 574, 576 and 578, or other peaks corresponding to histographic eye features, for a first eye image 210a in a sequence of eye images may be stored (e.g. in memory 114) by the peak finder 570 as at least one of a plurality of histogram references 120. In some embodiments, for example, the histogram references 120 may be retrieved by the peak finder 570 during processing of a second eye image 210b and a flow can be identified between histograms of subsequent images by tracking the 2-dimensional flow. In examples, storing and retrieving histogram references 120 may be beneficial in helping to reduce processing time between successive eye images 210 in a sequence of video frames or static images.

Returning to FIG. 2, the binarization threshold 250 may be input to a binarization block 260 to generate a binarized eye image 270. In examples, the binarization threshold 250 may be applied to the pixels of an eye image 210 to generate a binarized eye image 270 in which the gray value associated with each pixel is compared to the binarization threshold 250 and where the gray value of those pixels situated below the binarization threshold value may be set equal to zero (e.g. black) and the gray value of the remaining pixels situated above the binarization threshold value may be set equal to 1 (e.g. white). In this regard, the binarized image 270 may present a clearly exposed pupil where the shape of the pupil may be preserved very well across a variety of image conditions.

In some embodiments, for example, the binarized eye image 270 may be input to an optional pupil geometry estimator 280 to generate a pupil contour 290 and a pupil center 295. In examples, a variety of methods may be used to estimate a pupil contour 290 and a pupil center 295 from the binarized eye image 270. FIG. 2 illustrates the pupil geometry estimator 280 as being external to the pupil segmentation system 200. In other examples, the pupil geometry estimator 280 may be part of the pupil segmentation system 200.

Figure 6A:
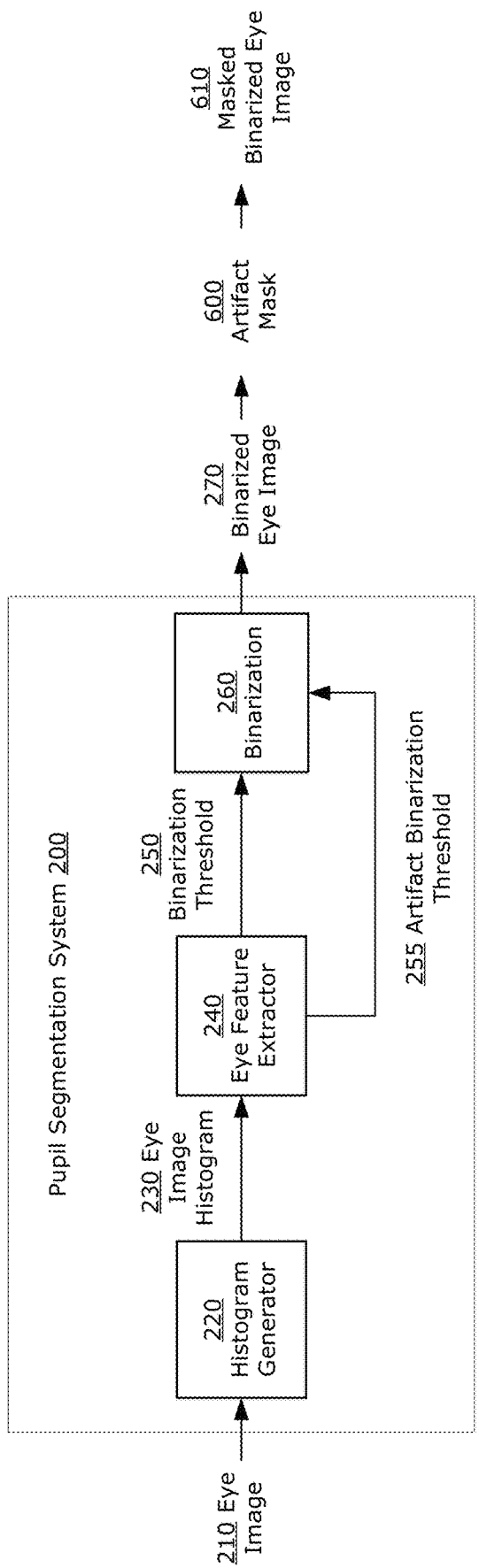
FIG. 6A is an example embodiment of the pupil segmentation system, in accordance with examples of the present disclosure.

FIG. 6A illustrates an example embodiment of the pupil segmentation system 200, in accordance with examples of the present disclosure. In the example embodiment, an artifact binarization threshold 255 may also be generated by the eye feature extractor 240 and input to the binarization block 260. In some examples, the eye image 210 may include areas of the image that appear to be darker than the pupil 301, for example, when the eye image 210 includes pigments associated with eye makeup 305 worn by an individual, or due to insufficient lighting conditions, among others. In examples, dark areas of an image may be visible as a dark artifact region 605 feature adjacent to a pupil region 405 in a corresponding interpolated eye image histogram 520. In this regard, dark artifacts that remain visible in a binarized eye image 270 may interfere with pupil contour detection or other processing of the binarized eye image 270.

Figure 6B:
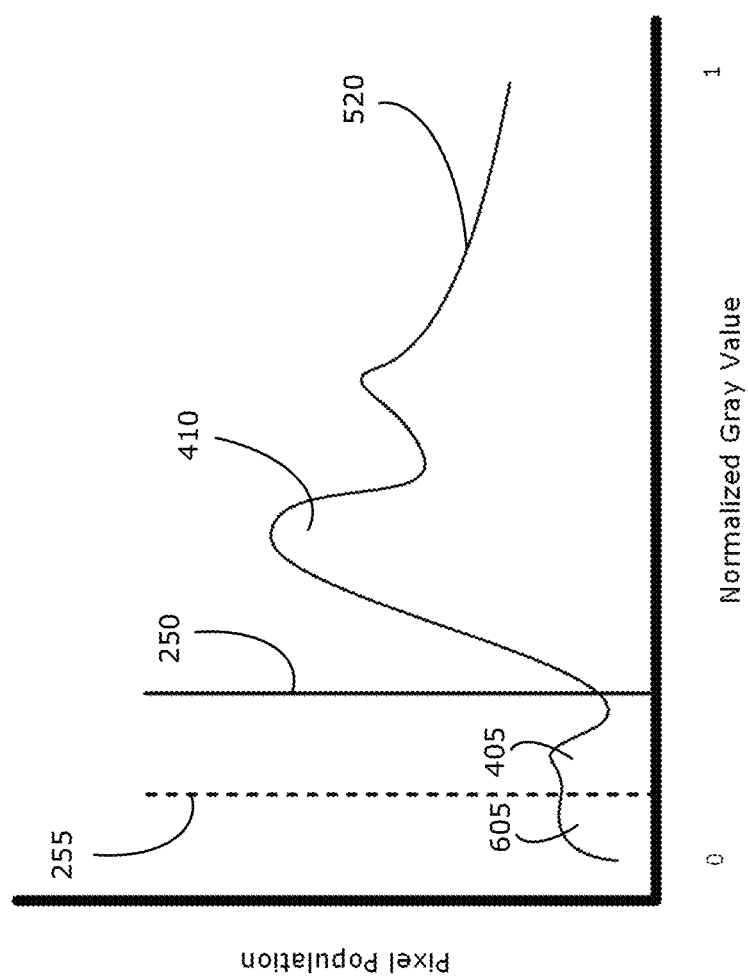
FIG. 6B is an example interpolated eye image histogram, in accordance with an example embodiment of the present disclosure.

FIG. 6B illustrates an example interpolated eye image histogram 520, in accordance with the example embodiment of the present disclosure. In examples, a dark artifact region 605 is visible adjacent to a pupil region 405 in the interpolated eye image histogram 520. In examples, the artifact binarization threshold 255 may effectively separate the pupil region 405 from the dark artifact region 605. In some embodiments, for example, using the artifact threshold 255, a preliminary binarization may be performed on the eye image 210 to remove the dark artifacts from the eye image 210 prior to performing threshold binarization using the binarization threshold 250.

Figures 6C, 6D, 6E:
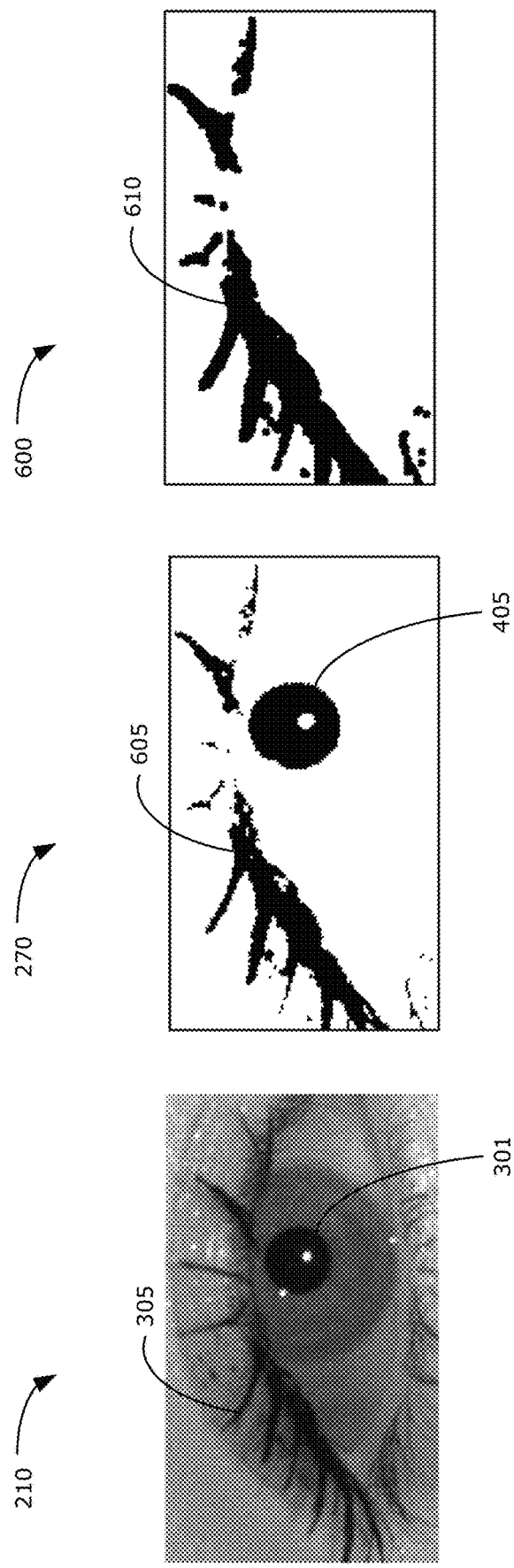
FIGS. 6C-6E are example eye images, in accordance with an example embodiment of the present disclosure.

FIGS. 6C-E illustrate example eye images, in accordance with the example embodiment of the present disclosure. In examples, FIG. 6C illustrates an example eye image 210 including areas of the image (e.g. eye makeup 305) that appear to be darker than the pupil 301. FIG. 6D illustrates an example binarized eye image 270 corresponding to the eye image 210 of FIG. 6C, where the dark artifact region 605 and pupil region 405 are both visible. In examples, by applying the artifact binarization threshold 255 in a preliminary binarization operation, the exposed dark artifact region 605 can then be dilated and masked from the original image before pupil threshold binarization to generate a masked binarized eye image 610. FIG. 6E illustrates an example artifact mask 600 obtained using dilated dark artifacts 610. In some examples, to mitigate any negative impact to the resulting pupil contour caused by dark artifact masking, cascading of the binarization method steps may be performed on a region of interest (ROI) about the pupil. Although the disclosed methods have described the use of an artifact threshold 255 to assist the removal of dark artifacts from an eye image 210, it is understood that other artifacts in an eye image 210 other than dark artifacts may be removed using the artifact threshold 255.

Figure 7B:
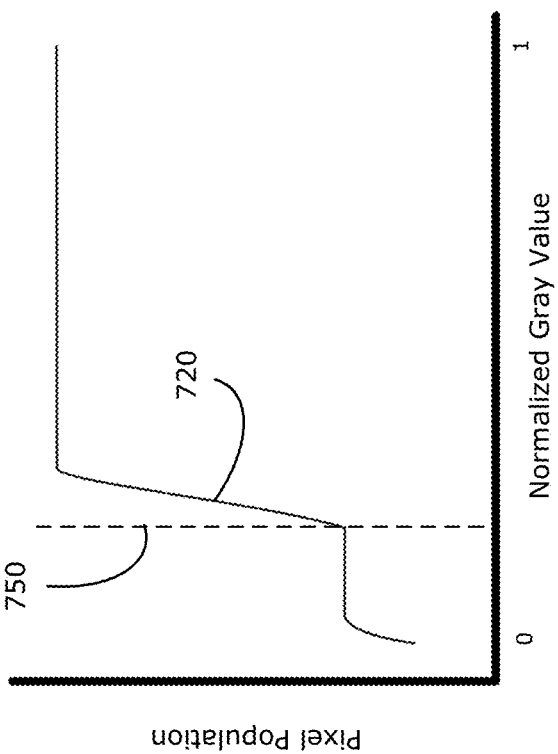
FIGS. 7A and 7B illustrate example interpolated eye image histograms, in accordance with an example embodiment of the present disclosure.
Figure 7A:
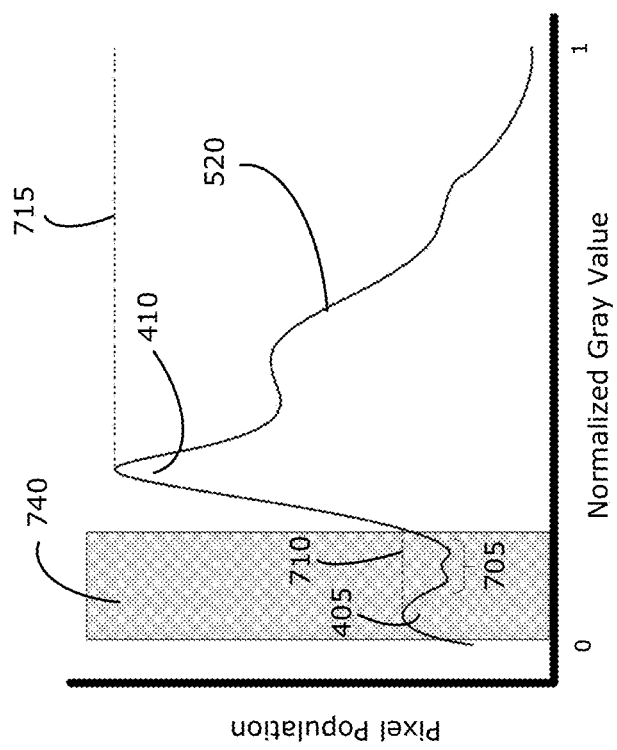

FIGS. 7A and 7B illustrate an example interpolated eye image histogram 520 and high-pass filtered eye image histogram 720, respectively, in accordance with an example embodiment of the present disclosure. In certain circumstances, significant noise 705 may be visible between the peaks of the pupil region 405 and iris region 410 in an interpolated eye image histogram 520, as shown in FIG. 7A. In this regard, such noise may pose challenges with determining an optimal binarization threshold 250 for an eye image 210, for example, by introducing a prominent acceleration peak in the pixel population acceleration 560 that may not maximally capture the pupil contour. In some embodiments, for example, an incremental high-pass filter may be applied to the interpolated eye image histogram 520 as an optional element of the filter block 510 of the eye feature extractor 240 to generate a high-pass filtered eye image histogram 720. In examples, one or more plateaus (e.g. pupil region plateau 710 and iris region plateau 715)

may be introduced by the high-pass filter that correspond with local maxima in the interpolated eye image histogram 520. In examples, a pupil-iris window 740 may be defined using the intersection of the pupil region plateau 710 and the interpolated eye image histogram 520 as the upper search boundary of the pupil-iris window 740. In examples, as shown in FIG. 7B, a binarization threshold 250 may be determined from a prominent acceleration peak in the pixel population acceleration 560 corresponding to the pupil-iris window 740. In examples, the binarization threshold 250 may correspond to a gray value immediately before the intersection of the pupil region plateau 710 and the interpolated eye image histogram 520.

Figure 8:
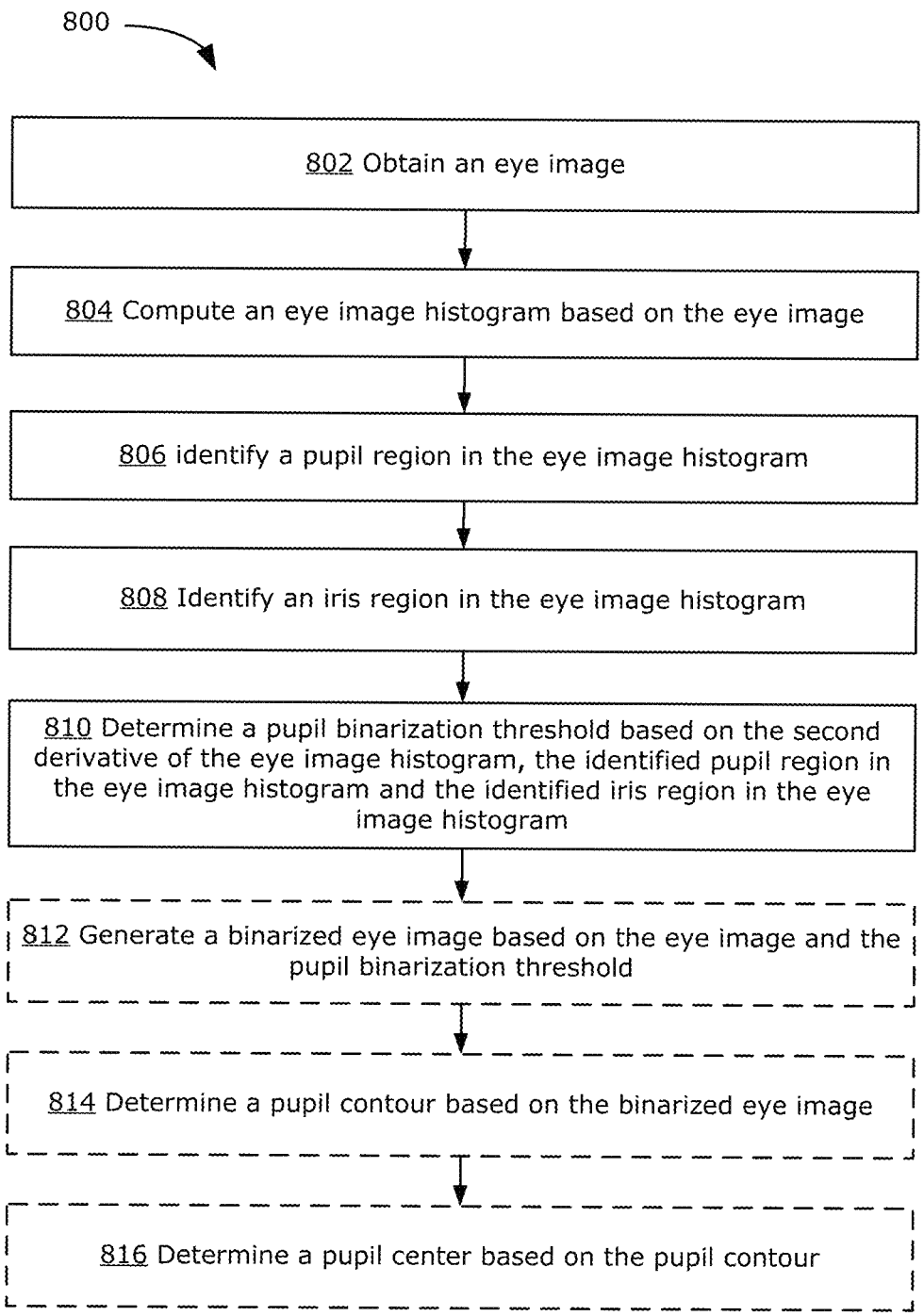
FIG. 8 is a flowchart illustrating an example method for obtaining a binarized eye image, in accordance with examples of the present disclosure.

FIG. 8 is a flowchart illustrating an example method 800 for obtaining a binarized eye image 270, which can be used for estimating a pupil contour 290 or a pupil center 295, in accordance with examples of the present disclosure. The method 800 may be performed by the computing system 100. For example, the processor 102 may execute computer readable instructions (which may be stored in the memory 114) to cause the computing system 100 to perform the method 800. The method 800 may be performed using a single physical machine (e.g., a workstation or server), a plurality of physical machines working together (e.g., a server cluster), or cloud-based resources (e.g., using virtual resources on a cloud computing platform).

Method 800 begins with step 802 in which an eye image 210 is obtained. The eye image 210 may be captured by a camera 108 on the computing system 100 or may be a digital image or video frame taken by another camera on another electronic device and communicated to the computing system 100.

At step 804, an eye image histogram 230 is computed based on the eye image 210. In examples, the eye image histogram 230 may represent a frequency distribution of pixel population with respect to gray value in a grayscale eye image 210. In examples, the eye image histogram 230 may show two prominent peaks, for example, a first peak representative of the pupil region 405, the pupil region 405 being associated with a darker gray value, and a second peak representative of the iris region 410, the iris region 410 being associated with a lighter gray value.

At steps 806 and 808, upper and lower boundaries may be identified corresponding the pupil region 405 and the iris region 410, respectively. In examples, the upper and lower boundaries of the pupil region 405 and iris region 410, respectively, may be used to define a pupil-iris window 540.

At step 810, a binarization threshold 250 may be determined based on the second derivative of the eye image histogram 230, the identified pupil region 405 and the identified iris region 410. In examples, the eye image histogram 230 may be filtered and interpolated to generate an interpolated eye image histogram 520 and the second derivative of the interpolated eye image histogram 520 may be computed to generate a pixel population acceleration 560. A prominent acceleration peak 572 may be identified in the pixel population acceleration 560 that is located within the pupil-iris window 540, where the prominent acceleration peak 572 has a corresponding gray value. In examples, the gray value corresponding to the prominent acceleration peak 572 may be defined as the optimal binarization threshold 250.

Optionally, in some embodiments, for example, steps 802 to 810 may be iterated to obtain a further refined threshold. In examples, a first binarization threshold may be obtained and used to roughly localize the pupil, and then subsequent binarization thresholds may be determined and applied one or more times on a sub-frame region of interest (ROI) containing the pupil. In examples, an advantage of cascading the binarization threshold approach is that a refined binarization threshold may be obtained that maximally captures the geometric features of the pupil.

Optionally, at step 812, a binarized eye image 270 may be generated based on the eye image 210 and the pupil binarization threshold 250. In examples, the binarization threshold 250 may be applied in a segmentation approach to binarize the pixels of the eye image 210 into one of two classes (e.g. pupil and non-pupil) based on the binarization threshold.

Optionally, at step 814, a pupil contour 290 may be determined using a variety of pupil geometry estimation approaches, based on the binarized eye image 270. Optionally, at step 816 a pupil center 295 may be determined using a variety of pupil geometry estimation approaches, based on the pupil contour 290. In examples, at least one of the pupil contour 290 or the pupil center 295 may be input to a gaze estimation system to estimate a gaze vector representing a gaze direction or to estimate a point of gaze (POG), for example, on a screen or in the surrounding environment. In other embodiments, for example, at least one of the pupil contour 290 or the pupil center 295 may be used to localize other features of the eye or regions of the eye.

While described primarily in the context of a gaze estimation, various other eye-tracking or eye movement monitoring applications that require precise tracking of the eye or pupil may benefit from some or all aspects of the present disclosure. Some examples include: medical devices and software (e.g. ocular surgical and testing procedures require precise feature tracking to align instruments), neurological tests to asses pupil state and response to stimulus, iris biometric identification (e.g. accurate positioning of a pupil may improve iris recognition), lightfield rendering and on-eye display projection. For example, lightfield rendering is a complex field of computational optics and is currently only practical when rendering for a limited number of 3D viewpoints. If lightfields are rendered for users, these 3D viewpoints are at the exact center of the optical aperture of an eye (pupil). Therefore, determining the center of the pupil as precisely as possible may result in more accurate lightfield rendering for a user. Similarly, on-eye projection displays require precise localization of the same aperture.

Various embodiments of the present disclosure having been thus described in detail by way of example, it will be apparent to those skilled in the art that variations and modifications may be made without departing from the disclosure. The disclosure includes all such variations and modifications as fall within the scope of the appended claims.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration in-formation, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
   obtaining an eye image captured by a camera;
   computing an eye image histogram that represents a frequency distribution of a plurality of pixel values within the eye image, each bar in the eye image histogram corresponding to a respective pixel count;
   identifying a pupil region in the eye image histogram;
   identifying an iris region in the eye image histogram; and
   determining a pupil binarization threshold based on a second derivative function of the eye image histogram, the identified pupil region in the eye image histogram and the identified iris region in the eye image histogram.

2. The method of claim 1, further comprising:
   generating a binarized eye image based on the eye image and the pupil binarization threshold.

3. The method of claim 2, further comprising:
   determining a pupil contour based on the binarized eye image; and
   determining a pupil center based on the pupil contour.

4. The method of claim 1, wherein determining a pupil binarization threshold comprises:
   computing the second derivative function of the eye image histogram to generate a pixel population acceleration;
   identifying a prominent acceleration peak in the pixel population acceleration, the prominent acceleration peak having a corresponding gray value; and
   determining the pupil binarization threshold based on the gray value corresponding to the prominent acceleration peak.

5. The method of claim 4, further comprising:
   prior to determining a pupil binarization threshold:
   identifying an artifact region in the eye image histogram;
   identifying an artifact region acceleration peak in the pixel population acceleration, the artifact region acceleration peak having a corresponding gray value; and
   determining an artifact threshold as the gray value corresponding to an artifact region acceleration peak.

6. The method of claim 5, further comprising:
   generating an artifact mask based on the eye image and the artifact threshold; and
   applying the artifact mask to the binarized eye image.

7. The method of claim 4, further comprising:
   prior to identifying a pupil region in the eye image histogram:
   processing the eye image histogram using an incremental high-pass filter.

8. The method of claim 1, wherein the pupil region in the eye image histogram includes an upper pupil region boundary and a lower pupil region boundary and the iris region in the eye image histogram includes an upper iris region boundary and a lower iris region boundary.

9. The method of claim 1, wherein the eye image is a grayscale eye image and the histogram represents a frequency distribution of pixel gray values in the grayscale eye image.

10. A system for determining a pupil binarization threshold, the system comprising:
    one or more processor devices; and
    one or more memories storing machine-executable instructions, which when executed by the one or more processor devices, cause the system to:
    obtain an eye image;
    compute an eye image histogram that represents a frequency distribution of a plurality of pixel values within the eye image, each bar in the eye image histogram corresponding to a respective pixel count;
    identify a pupil region in the eye image histogram;
    identify an iris region in the eye image histogram; and
    determine a pupil binarization threshold based on a second derivative function of the eye image histogram, the identified pupil region in the eye image histogram and the identified iris region in the eye image histogram.

11. The system of claim 10, further comprising:
    a camera, wherein the eye image is obtained from the camera.

12. The system of claim 10, further comprising:
    a head mounted device; and
    a camera coupled to the head mounted device, wherein the eye image is obtained from the camera.

13. The system of claim 10, wherein the machine-executable instructions, when executed by the one or more processors further cause the system to:
    generate a binarized eye image based on the eye image and the pupil binarization threshold.

14. The system of claim 13, wherein the machine-executable instructions, when executed by the one or more processors further cause the system to:
    determine a pupil contour based on the binarized eye image; and
    determine a pupil center based on the pupil contour.

15. The system of claim 10, wherein the machine-executable instructions, when executed by the one or more processors to determine a pupil binarization threshold, further cause the system to:
    compute the second derivative function of the eye image histogram to generate a pixel population acceleration;

identify a prominent acceleration peak in the pixel population acceleration, the prominent acceleration peak having a corresponding gray value; and determine the pupil binarization threshold based on the gray value corresponding to the prominent acceleration peak.

16. The system of claim 15, wherein the machine-executable instructions, when executed by the one or more processors, further cause the system to:

prior to determining a pupil binarization threshold:
identify an artifact region in the eye image histogram;
identify an artifact region acceleration peak in the pixel population acceleration, the artifact region acceleration peak having a corresponding gray value;
determine an artifact threshold as the gray value corresponding to an artifact region acceleration peak;
generate an artifact mask based on the eye image and the artifact threshold; and
apply the artifact mask to the binarized eye image.

17. The system of claim 15, wherein the machine-executable instructions, when executed by the one or more processors, further cause the system to:

prior to identifying a pupil region in the eye image histogram:
process the eye image histogram using an incremental high-pass filter.

18. The system of claim 10, wherein the pupil region includes an upper pupil region boundary and a lower pupil region boundary and the iris region includes an upper iris region boundary and a lower iris region boundary.

19. The system of claim 10, wherein the eye image is a grayscale eye image and the histogram represents a frequency distribution of pixel gray values in the grayscale eye image.

20. A non-transitory computer-readable medium having machine-executable instructions stored thereon which, when executed by one or more processors of a computing system, cause the computing system to:

obtain an eye image;
compute an eye image histogram that represents a frequency distribution of a plurality of pixel values within the eye image, each bar in the eye image histogram corresponding to a respective pixel count;
identify a pupil region in the eye image histogram;
identify an iris region in the eye image histogram; and
determine a pupil binarization threshold based on a second derivative function of the eye image histogram, the identified pupil region in the eye image histogram and the identified iris region in the eye image histogram.

* * * * *